(12) United States Patent
Kim (10) Patent No.: US 12,546,675 B2
(45) Date of Patent: Feb. 10, 2026

(54) APPARATUS, METHOD AND COMPUTER READABLE MEDIUM FOR DIAGNOSING FAULT OF LOAD CELL

(71) Applicants: Hyundai Motor Company, Seoul (KR); Kia Corporation, Seoul (KR)

(72) Inventor: Do Kon Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 558 days.

(21) Appl. No.: 17/968,030

(22) Filed: Oct. 18, 2022

(65) Prior Publication Data

US 2023/0408359 A1    Dec. 21, 2023

(30) Foreign Application Priority Data

Jun. 16, 2022  (KR) .................. 10-2022-0073715

(51) Int. Cl.

| | |
|---|---|
| *G01L 25/00* | (2006.01) |
| *B62D 5/04* | (2006.01) |
| *G01L 1/22* | (2006.01) |
| *G01L 5/16* | (2020.01) |
| *G01L 5/1627* | (2020.01) |
| *G01R 19/00* | (2006.01) |

(52) U.S. Cl.
CPC .............. *G01L 25/00* (2013.01); *B62D 5/049* (2013.01); *G01L 1/22* (2013.01); *G01L 5/16* (2013.01); *G01L 5/1627* (2020.01); *G01R 19/0084* (2013.01); *G01L 1/2262* (2013.01)

(58) Field of Classification Search
CPC ..... G01R 19/0084; G01L 5/16; G01L 1/2262; G01L 1/22; G01L 5/1627; G01L 25/006; G01L 25/00; B62D 5/049

USPC ............................................ 73/1.15; 177/211
See application file for complete search history.

(56) References Cited

U.S. PATENT DOCUMENTS

| | | | | |
|---|---|---|---|---|
| 3,166,135 A | * | 1/1965 | Clamp .................. | G01G 3/145 |
| | | | | 330/69 |
| 3,618,376 A | * | 11/1971 | Shull ...................... | G01L 5/221 |
| | | | | 73/862.05 |

(Continued)

FOREIGN PATENT DOCUMENTS

| | | | | |
|---|---|---|---|---|
| CN | 110103740 A | * | 8/2019 | .............. B60L 53/12 |
| CN | 107741269 B | | 8/2020 | |

(Continued)

OTHER PUBLICATIONS

Translation JP_08210898 (Year: 1996).*
Translation JP-2009294175 (Year: 2009).*
Translation JP2010181224 (Year: 2010).*

*Primary Examiner* — Peter J Macchiarolo
*Assistant Examiner* — Monica S Young
(74) *Attorney, Agent, or Firm* — Fish & Richardson P.C.

(57) ABSTRACT

An apparatus for diagnosing a fault of a load cell includes a power supply unit applying power to an input terminal of a plurality of load cells connected in parallel, each of the plurality of load cells including an input terminal and an output terminal, a fault diagnosis resistor being connected to the output terminal, a voltage measurement unit measuring a voltage applied to the fault diagnosis resistor provided in the output terminal of each of the plurality of load cells, after power is applied thereto, and a controller diagnosing a fault of each of the plurality of load cells based on the measured voltage.

17 Claims, 6 Drawing Sheets

(56) References Cited

U.S. PATENT DOCUMENTS

| | | | | |
|---|---|---|---|---|
| 4,175,249 A | * | 11/1979 | Gruber | H02J 7/35 |
| | | | | 323/283 |
| 5,296,655 A | * | 3/1994 | Sargent | G01G 23/163 |
| | | | | 177/199 |
| 5,359,301 A | * | 10/1994 | Candage | H03K 5/133 |
| | | | | 327/288 |
| 6,792,275 B1 | * | 9/2004 | Lo | H04W 16/04 |
| | | | | 455/452.2 |
| 8,022,316 B2 | | 9/2011 | Trautweiler et al. | |
| 9,434,369 B1 | * | 9/2016 | Georgin | B64D 45/00 |
| 10,260,933 B2 | * | 4/2019 | Kostic | G01G 23/01 |
| 2005/0119916 A1 | * | 6/2005 | Mallett | B07C 5/3412 |
| | | | | 705/2 |

FOREIGN PATENT DOCUMENTS

| | | | | |
|---|---|---|---|---|
| CN | 112985571 A | | 6/2021 | |
| EP | 2133671 A2 | | 12/2009 | |
| JP | 08210898 A | * | 8/1996 | |
| JP | 2009294175 A | * | 12/2009 | G01G 3/1404 |
| JP | 2010181224 A | * | 8/2010 | |
| JP | 5066010 B2 | | 11/2012 | |
| KR | 10-0296013 B1 | | 10/2001 | |
| KR | 10-2017-0016083 A | | 2/2017 | |
| KR | 20170016083 A | * | 2/2017 | |
| KR | 10-2021-0072976 A | | 6/2021 | |

* cited by examiner

APPARATUS, METHOD AND COMPUTER READABLE MEDIUM FOR DIAGNOSING FAULT OF LOAD CELL

CROSS-REFERENCE TO RELATED APPLICATION(S)

This application claims benefit of priority to Korean Patent Application No. 10-2022-0073715 filed on Jun. 16, 2022 in the Korean Intellectual Property Office, the disclosure of which is incorporated herein by reference in its entirety.

TECHNICAL FIELD

The present disclosure relates to an apparatus, method, and computer-readable medium for diagnosing a fault of a load cell.

BACKGROUND

A steering method of a personal mobility device can include a mechanical steering method and an electronic steering method, and recently, the electronic steering method has been widely used.

The electronic steering method can use a multi-degree of freedom force-torque (F/T) sensor or an electromyogram (EMG) sensor. However, the multi-degree of freedom F/T sensor can be expensive, and with the EMG sensor, it may be difficult to obtain reliable signals.

In order to solve the aforementioned and other potential shortcomings, a method of using a low-cost load cell has emerged. A load cell is a sensor that may measure a force or load by converting a physical quantity such as force or load into an electrical signal.

In general, it is preferred to use a plurality of load cells for steering of a personal mobility device. However, if any one of the plurality of load cells fails, steering in a corresponding direction can become impossible, which may cause an accident. Therefore, it can be beneficial to diagnose a fault of a load cell in advance and notify a driver thereof.

SUMMARY

Exemplary implementations provide an apparatus, method, and computer-readable storage medium for diagnosing a fault of a load cell to prevent an accident due to inability to steer in advance, by diagnosing the fault of the load cell in advance.

According to an aspect of the present disclosure, an apparatus for diagnosing a fault of a load cell includes: a power supply unit applying power to an input terminal of a plurality of load cells connected in parallel, each of the plurality of load cells including an input terminal and an output terminal, a fault diagnosis resistor being connected to the output terminal; a voltage measurement unit measuring a voltage applied to the fault diagnosis resistor provided in the output terminal of each of the plurality of load cells, after power is applied thereto; and a controller diagnosing a fault of each of the plurality of load cells based on the measured voltage.

According to another aspect of the present disclosure, a method for diagnosing a fault of a load cell includes: a first operation of applying power to an input terminal of a plurality of load cells connected in parallel, each of the plurality of load cells including an input terminal and an output terminal, a fault diagnosis resistor being connected to the output terminal; a second operation of measuring a voltage applied to the fault diagnosis resistor provided in the output terminal of each of the plurality of load cells, after power is applied thereto; and a third operation of diagnosing a fault of each of the plurality of load cells based on the measured voltage.

According to another aspect of the present disclosure, there is provided a computer-readable storage medium in which a program for executing the above method in a computer is recorded.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, exemplary implementations of the present disclosure will be described with reference to the accompanying drawings. However, the exemplary implementation of the present disclosure may be modified in various other forms, and the scope of the present disclosure is not limited only to the exemplary implementations described below. The shapes and sizes of elements in the drawings may be exaggerated for clarity, and elements indicated by the same reference numerals in the drawings are the same elements.

Figure 1:
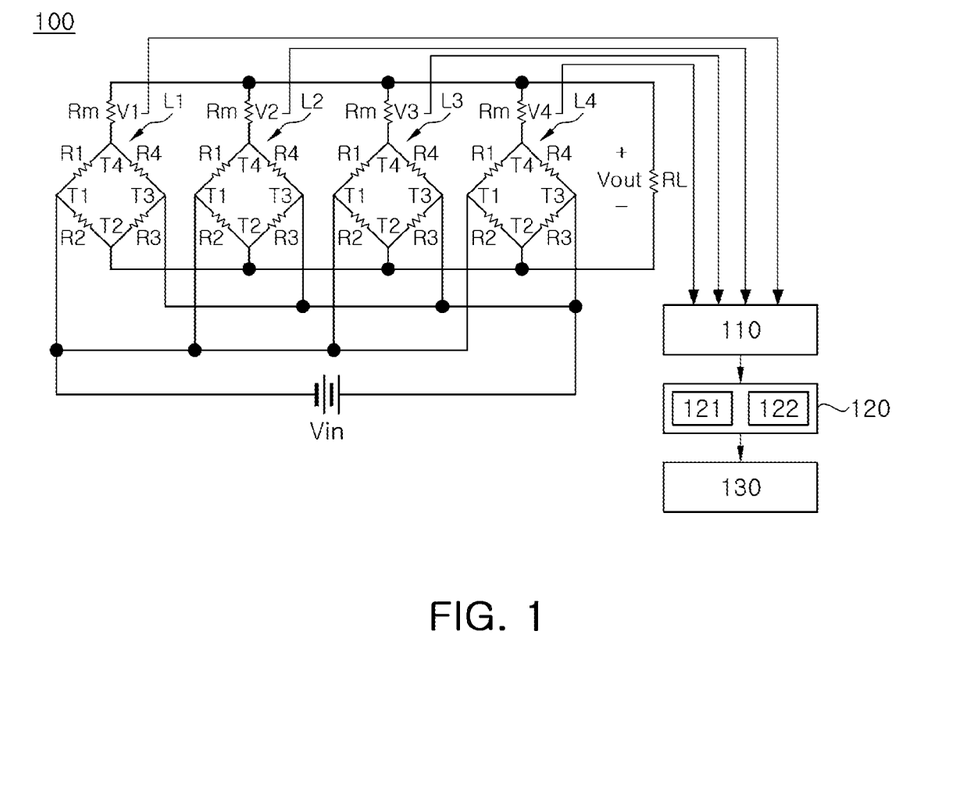
FIG. 1 is a block diagram of an example apparatus for diagnosing a fault of a load cell.

FIG. 1 is a block diagram of an apparatus for diagnosing a fault of a load cell.

As illustrated in FIG. 1, an apparatus for diagnosing a fault of a load cell may include a plurality of load cells L1 to L4 including a fault diagnosis resistor Rm, a power supply unit Vin, a voltage measurement unit 110, a controller 120, and an output unit 130. The aforementioned controller 120 may include a fuzzyfication unit 121 and a fault diagnosis unit 122.

First, each of the plurality of load cells L1 to L4 may include input terminals T1 and T3 and output terminals T2 and T4. The input terminals T1 and T3 may include a first input terminal T1 and a second input terminal T3, the output terminals T2 and T4 may include a first output terminal T2 and a second output terminal T4, and the fault diagnosis resistor Rm may be connected to one T4 of the output terminals.

The plurality of load cells L1 to L4 may be connected to each other in parallel.

That is, the first input terminals T1 of the plurality of load cells L1 to L4 are interconnected, and the second input terminals T3 of the plurality of load cells L1 to L4 are interconnected. In addition, the first output terminals T2 of the plurality of load cells L1 to L4 are interconnected, and the second output terminals T4 of the plurality of load cells L1 to L4 may be interconnected through the fault diagnosis resistor Rm.

Each of the plurality of load cells L1 to L4 described above may be represented as an equivalent circuit of a wheatstone bridge including four resistors R1 to R4, as illustrated in FIG. 1. The resistors R1 to R4 represent resistance of a strain gauge.

That is, a force applied to the strain gauge changes a resistance value of the strain gauge, and such a change in the resistance value changes a magnitude of an output voltage Vout applied to a load RL. That is, the load cell may convert the magnitude of the applied force into the form of the voltage Vout. The structure and operation of such a load cell is a well-known technology, and thus, a detailed description thereof will be omitted.

Meanwhile, according to an exemplary implementation of the present disclosure, as illustrated in FIG. 1, the fault diagnosis resistor Rm may be connected to one T4 of the output terminals T2 and T4 of each of the plurality of load cells L1 to L4. The fault diagnosis resistor Rm may be a resistor for diagnosing whether a load cell has a fault.

Meanwhile, the power supply unit Vin may be a power source for applying power to the input terminals T1 and T3 of the plurality of load cells L1 to L4 connected in parallel, for example, a DC power source.

After power is applied, the voltage measurement unit 110 may measure voltages V1 to V4 applied to the fault diagnosis resistor Rm connected to the output terminals T2 and T4 of each of the plurality of load cells L1 to L4. The measured voltages V1 to V4 may be transmitted to the controller 120.

The controller 120 may diagnose a fault of each of the plurality of load cells L1 to L4 based on the measured voltage. The controller 120 may sequentially diagnose whether each of the plurality of load cells L1 to L4 has a fault. The controller 120 may include the fuzzyfication unit 121 and the fault diagnosis unit 122.

Specifically, the fuzzyfication unit 121 may fuzzyficate a fault of each of the plurality of load cells L1 to L4 to a value between 0 and 1 based on the measured voltages V1 to V4. In the present disclosure, 'fuzzyfication' may refer to converting the degree of a fault of each of the plurality of load cells L1 to L4 into a value between 0 and 1 according to Equation 1 below.

$$f_i = \left| \frac{\left(\left(\sum_{i=1}^{n} vi\right)/n\right) - vi}{\frac{\sum_{i=1}^{n} vi}{n}} \right|$$ [Equation 1]

Here, fi may be a fuzzyficated value of a voltage applied to an i-th fault diagnosis resistor, n may be the number of fault diagnosis resistors, and vi may be a voltage applied to the i-th fault diagnosis resistor.

Next, the fault diagnosis unit 122 may diagnose a load cell having a fuzzyficated value equal to or greater than a reference value, among the plurality of load cells L1 to L4, as having a fault. Here, the reference value may be, for example, 0.3.

The aforementioned fuzzyficated values may be, for example, less than 0.1 (very good), 0.1 or more and less than 0.3 (good), 0.3 or more and less than 0.5 (not good), or more and less than 0.7 (bad), 0.7 or more and less than 0.9 (very bad), 0.9 or more (out of order), and an operation is performed normally when the fuzzyficated value belongs to the section less than 0.3 of "very good and good," and a fault may be diagnosed when the fuzzyficated value belong to the section equal to or greater than 0.3 of "not good, bad, very bad, and out of order section." It should be noted that the aforementioned ranges and specific values are intended to help understanding of the present disclosure, and may be changed according to the needs of those skilled in the art.

Finally, the output unit 130 may output the number of the load cell diagnosed as having a fault, among the plurality of load cells, in at least one of sound, visual and vibration methods.

Figure 2:
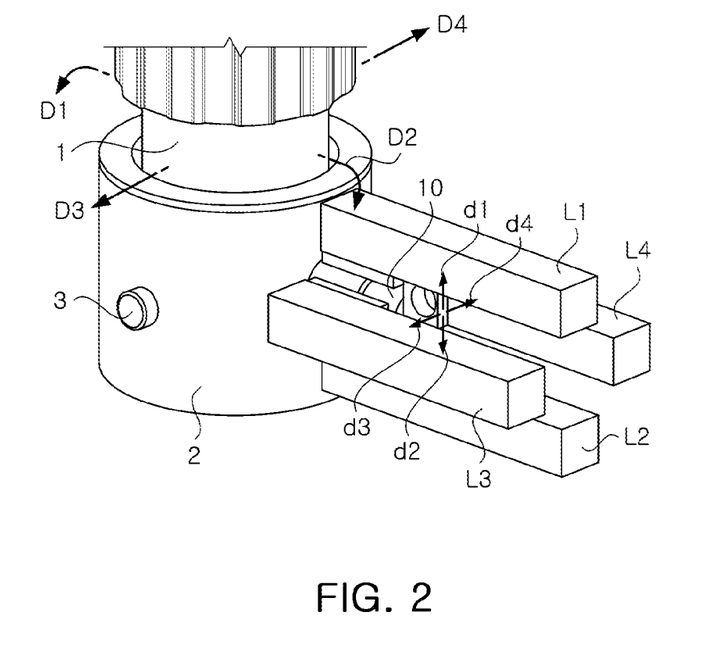
FIG. 2 is a view illustrating an example steering method using a plurality of load cells.

Meanwhile, FIG. 2 is a view illustrating a steering method using a plurality of load cells according to an exemplary implementation of the present disclosure.

Specifically, as illustrated in FIG. 2, a lower portion of a steering shaft 1 may be fastened to a shaft 3 in a lower case 2 and may rotate about the shaft 3 in a direction of D1 or D2 and may move along the shaft 3 in a direction of D3 or D4.

Also, the plurality of load cells L1 to L4 may be coupled to the case 2.

In addition, a pressing member 10 may be fastened to a lower portion of the steering shaft 1 and may move in an upward direction d1, a downward direction d2, a leftward direction d3, or a rightward direction d4 according to the movement of the steering shaft 1, and at this time, the pressing member 10 may press each of the load cells L1 to L4 in the opposite direction.

For example, when the steering shaft 1 pivots to the front D1, the pressing member 10 fastened to the steering shaft 1 moves in the upward direction d1 to press the upper load cell L1. At this time, since the output voltage Vout of the upper load cell L1 is varied, the direction may be recognized as a forward direction.

Similarly, when the steering shaft 1 pivots to the rear D2, the pressing member 10 fastened to the steering shaft 1 moves in the downward direction d2 to press the lower load cell L2. At this time, since the output voltage Vout of the lower load cell L2 is varied, the direction may be recognized as a backward direction.

Similarly, when the steering shaft 1 moves to the left D3, the pressing member 10 fastened to the steering shaft 1 moves in the leftward direction d3 to press the left load cell L3. At this time, since the output voltage Vout of the left load cell L3 is varied, the direction is recognized as the left direction.

Similarly, when the steering shaft 1 moves to the right D4, the pressing member 10 fastened to the steering shaft 1 moves in the rightward direction d4 to press the right load cell L4. At this time, since the output voltage Vout of the right load cell L4 is varied, the direction is recognized as the right direction.

It should be noted that the aforementioned steering method using a plurality of load cells illustrated in FIG. 2 is provided to help understanding of the present disclosure and may be variously modified according to the needs of those skilled in the art.

The plurality of load cells L1 to L4 described above may be used to detect forces applied to the front, rear, left, and right sides of the steering shaft of personal mobility device.

In addition, in the present disclosure described above, the personal mobility device may refer to personal mobility device means including an electric stroller, electric wagon, electric scooter, electric cart, electric vehicle, electric kickboard, and the like.

As described above, according to an exemplary implementation of the present disclosure, a fault diagnosis resistor may be added to an output terminal of an existing load cell, and a fault of the load cell may be diagnosed in advance based on a voltage applied to the fault diagnosis resistor.

In addition, according to an exemplary implementation of the present disclosure, by outputting the number of the load cell diagnosed as having a fault in at least one of sound, visual, and vibration methods, an accident due to inability to steer may be prevented in advance.

Figure 3:
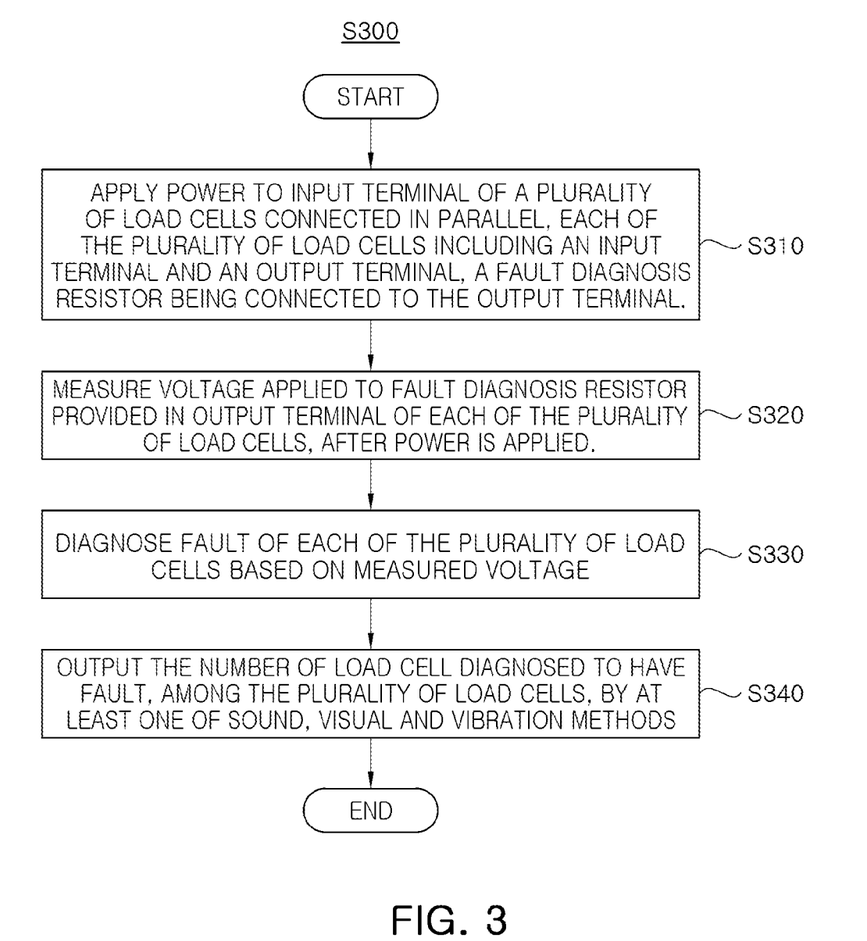
FIG. 3 is a flowchart illustrating an example method for diagnosing a fault of a load cell.
Figure 4:
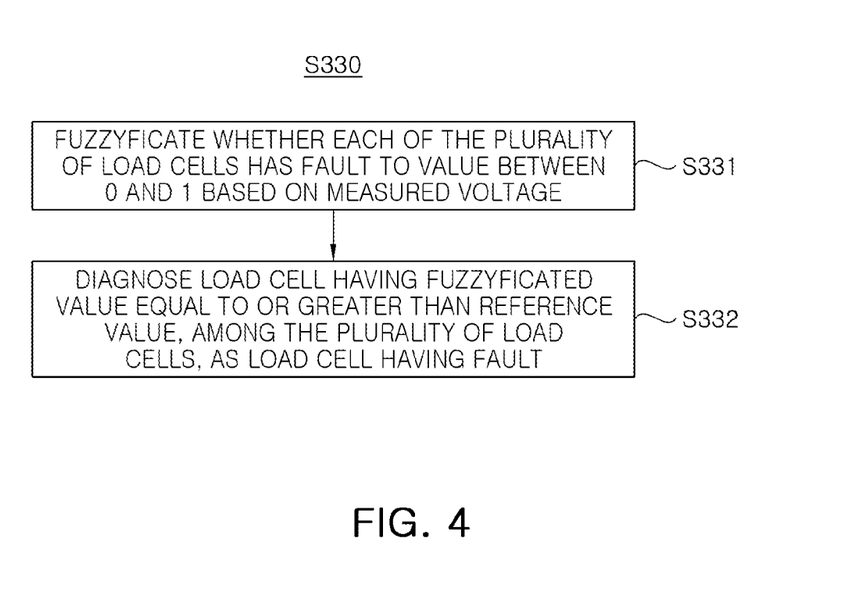
FIG. 4 is a specified flowchart of operation 330 of FIG. 3.

Finally, FIG. 3 is a flowchart illustrating a method for diagnosing a fault of a load cell. FIG. 4 is a specified flowchart of operation 330 of FIG. 3.

Hereinafter, a method (S300) for diagnosing a fault of a load cell will be described with reference to FIGS. 1 to 4.

Referring to FIGS. 1 to 4, the method S300 for diagnosing a fault of a load cell may be started by an operation (S310) of applying power to input terminals T1 and T3 of a plurality of load cells L1 to L4 connected in parallel.

Here, each of the plurality of load cells L1 to L4 may include input terminals T1 and T3 and output terminals T2 and T4. The input terminals T1 and T3 may include a first input terminal T1 and a second input terminal T1, and the output terminals T2 and T4 may include a first output terminal T2 and a second output terminal T4, and a fault diagnosis resistor Rm may be connected to one T4 of the output terminals T4 as described above.

Next, after power is applied to the input terminals of the load cells L1 to L4, the voltage measurement unit 110 may measure voltages V1 to V4 applied to the fault diagnosis resistor Rm connected to the output terminals T2 and T4 of each of the plurality of load cells L1 to L4 (S320). The measured voltages V1 to V4 may be transmitted to the controller 120.

The controller 120 may diagnose a fault of each of the plurality of load cells L1 to L4 based on the measured voltage (S330).

Specifically, as illustrated in FIG. 4, the fuzzyfication unit 121 of the controller 120 may fuzzyficate the fault of each of the plurality of load cells L1 to L4 to a value between 0 and 1 based on the measured voltage. As described above, 'fuzzyfication' may refer to converting the degree of a fault of each of the plurality of load cells L1 to L4 into a value between 0 and 1 according to Equation 1 above.

Next, the fault diagnosis unit 122 may diagnose a load cell having a fuzzyficated value equal to or greater than a reference value, among the plurality of load cells L1 to L4, as having a fault (S332). Here, the reference value may be, for example, 0.3, as described above.

Finally, in the method of diagnosing a fault of a load cell, the number of the load cell diagnosed as having a fault, among the plurality of load cells, may be output in at least one of sound, visual and vibration methods (S340).

As described above, the plurality of load cells L1 to L4 described above may be coupled to the case 2.

In addition, a pressing member 10 may be fastened to a lower portion of the steering shaft 1 and may move in an upward direction d1, a downward direction d2, a leftward direction d3, or a rightward direction d4 according to the movement of the steering shaft 1, and at this time, the pressing member 10 may press each of the load cells L1 to L4 in the opposite direction to thereby recognize a forward direction, a backward direction, a leftward direction, or a rightward direction.

For example, when the steering shaft 1 pivots to the front D1, the pressing member 10 fastened to the steering shaft 1 moves in the upward direction d1 to press the upper load cell L1. At this time, since the output voltage Vout of the upper load cell L1 is varied, the direction may be recognized as a forward direction.

Similarly, when the steering shaft 1 pivots to the rear D2, the pressing member 10 fastened to the steering shaft 1 moves in the downward direction d2 to press the lower load cell L2. At this time, since the output voltage Vout of the lower load cell L2 is varied, the direction may be recognized as a backward direction.

Similarly, when the steering shaft 1 moves to the left D3, the pressing member 10 fastened to the steering shaft 1 moves in the leftward direction d3 to press the left load cell L3. At this time, since the output voltage Vout of the left load cell L3 is varied, the direction is recognized as the left direction.

Similarly, when the steering shaft 1 moves to the right D4, the pressing member 10 fastened to the steering shaft 1 moves in the rightward direction d4 to press the right load cell L4. At this time, since the output voltage Vout of the right load cell L4 is varied, the direction is recognized as the right direction.

Figure 5:
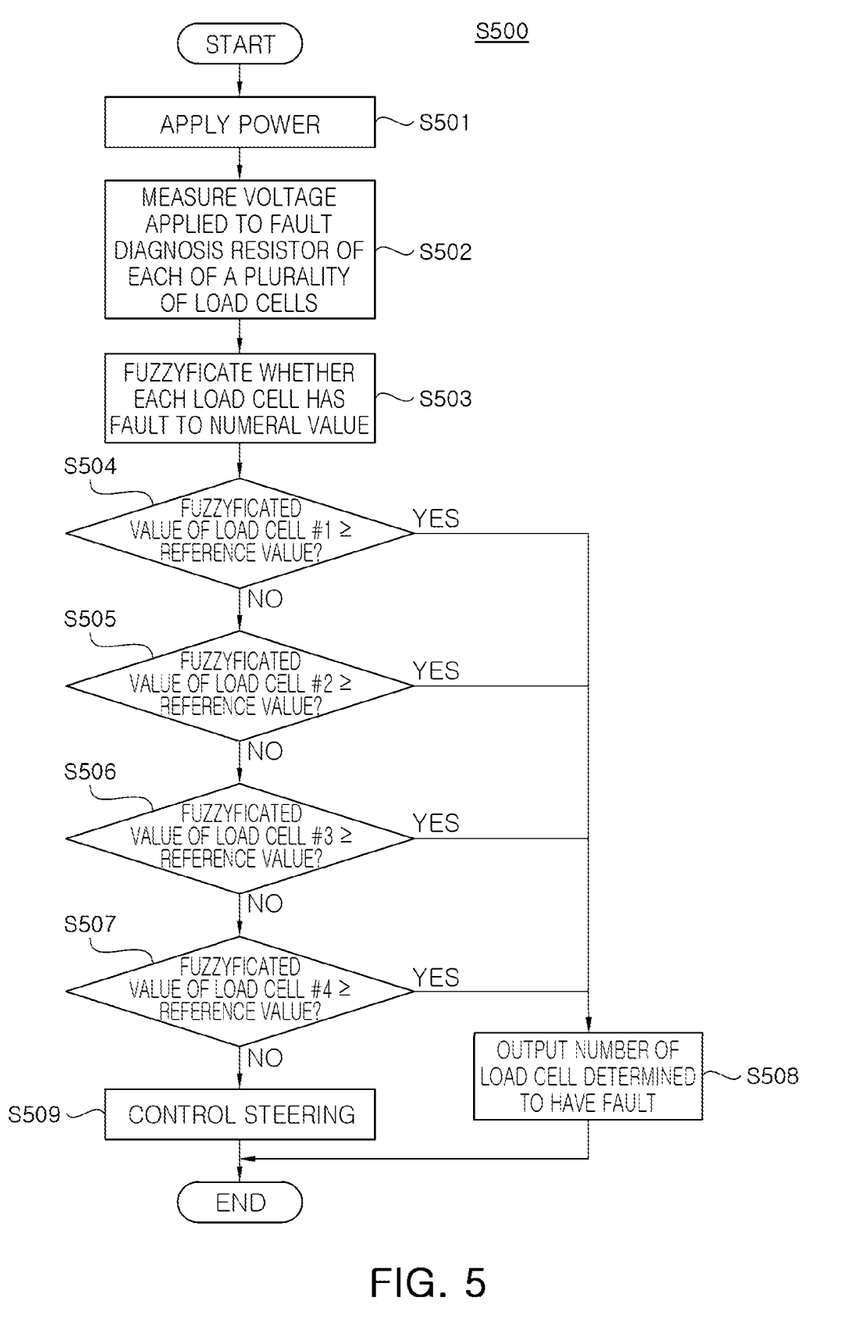
FIG. 5 is a flowchart illustrating an example method for sequentially diagnosing a fault of a load cell.

Meanwhile, FIG. 5 is a flowchart illustrating a method for sequentially diagnosing a fault of a load cell. For understanding of the present disclosure, it should be noted that 4 load cells are assumed in FIG. 5.

As illustrated in FIGS. 1 and 5, first, a power Vin is applied to the four load cells L1 to L4 (S501).

Thereafter, after power is applied to the four load cells L1 to L4, the voltage measurement unit 110 may measure the voltages V1 to V4 applied to the fault diagnosis resistor Rm of each of the load cells L1 to L4 (S502). The measured voltages V1 to V4 may be transmitted to the controller 120.

Next, the controller 120 may fuzzyficate the fault of each of the load cells L1 to L4 to a value between 0 and 1 based on the measured voltages V1 to V4 (S503).

Thereafter, the controller 120 may determine whether the fuzzyficated value of a first load cell L1 is equal to or greater than a reference value (S504). If the fuzzyficated value is not equal to or greater than the reference value as a result of the determination, the process proceeds to operation S505.

In operation S505, the controller 120 may determine whether a fuzzyficated value of a second load cell L2 is equal to or greater than the reference value (S505). If it is not as a result of the determination, the process proceeds to operation S506.

In operation S506, the controller 120 may determine whether a fuzzyficated value of a third load cell L3 is equal to or greater than the reference value (S506). If it is not as a result of the determination, the process proceeds to operation S505.

In operation S507, the controller 120 may determine whether the fuzzyficated value of the third load cell L3 is equal to or greater than the reference value (S507). If it is not as a result of the determination, the process proceeds to operation S509.

In operation S509, steering control may be performed based on the four load cells L1 to L4.

Meanwhile, in at least one of operations S504 to S507, if the fuzzyficated value is less than the reference value, the controller 120 may output the number of the load cell determined to have a fault in at least one of sound, visual, and vibration methods (S508).

Figure 6:
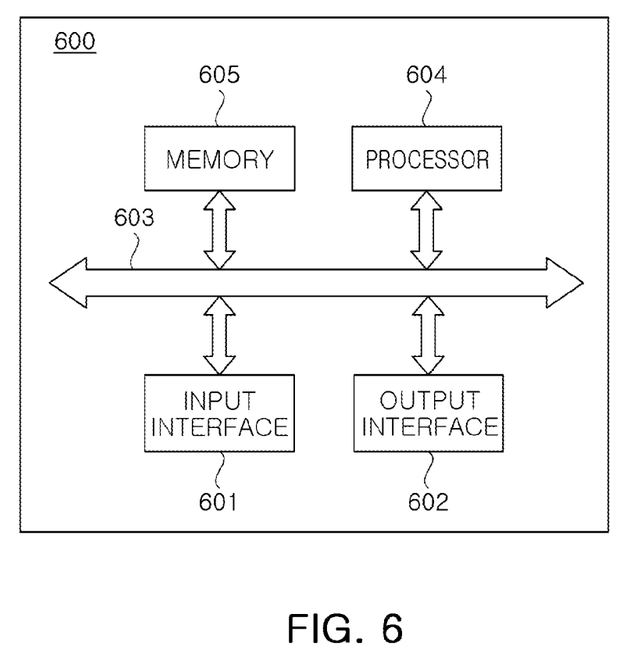
FIG. 6 is a block diagram of an example computer device capable of fully or partially implementing an apparatus for diagnosing a fault of a load cell.

Meanwhile, FIG. 6 is a block diagram of a computer device that may fully or partially implement the apparatus 100 for diagnosing a fault of a load cell.

As illustrated in FIG. 6, a computer device 600 may include an input interface 601, an output interface 602, a processor 604, and a memory 605, and the input interface 601, the output interface 602, the processor 604, and the memory 605 may be interconnected via a system bus 603.

In an exemplary implementation of the present disclosure, the memory 605 may be used to store a program, instruction or code, and the processor 604 may execute the program, instruction or code stored in the memory 605, receive a signal by controlling the input interface 601, and transmit a signal by controlling the output interface 602. The aforementioned memory 605 may include read-only memory and random access memory, and may provide instructions and data to the processor 604.

In an exemplary implementation of the present disclosure, the processor 604 may be a central processing unit (CPU), other general-purpose processors, digital signal processors (DSPs), application specific integrated circuits (ASIC), field programmable gate array (FPGA) or other programmable logic device, discrete gate or transistor logic device, discrete hardware component, or the like. A general-purpose processor may be a microprocessor, or the corresponding processor may be any conventional processor or the like.

In an implementation process, the method performed in each device of FIG. 1 may be achieved by an integrated logic circuit of hardware in the processor 504 or an instruction in the form of software. The contents of the method disclosed in relation to the exemplary implementation of the present disclosure may be implemented to be performed and completed by a hardware processor, or may be performed and completed by a combination of hardware and software modules of the processor. The software module may be disposed in a storage medium such as random access memory, flash memory, read-only memory, programmable read-only memory or electrically erasable programmable memory, registers, and the like. The corresponding storage medium is located in the memory 505, and the processor 604 reads information from the memory 605 and implements the contents of the aforementioned method in combination with hardware. In order to avoid repetition, detailed descriptions thereof are omitted herein.

According to an exemplary implementation of the present disclosure, a fault diagnosis resistor may be added to an output terminal of an existing load cell, and a fault of a load cell may be diagnosed in advance based on a voltage applied to the fault diagnosis resistor.

In addition, according to an exemplary implementation of the present disclosure, it is possible to prevent an accident due to inability to steer in advance by outputting the number of a load cell diagnosed as having a fault in at least one of sound, visual, and vibration methods.

While example exemplary implementations have been shown and described above, it will be apparent to those skilled in the art that modifications and variations could be made without departing from the scope of the present disclosure as defined by the appended claims.

What is claimed is:

1. An apparatus for determining a fault of a load cell, the apparatus comprising:
   a plurality of load cells connected in parallel, each of the plurality of load cells including an input terminal and an output terminal;
   a plurality of fault diagnosis resistors each connected to an output terminal of each of the plurality of load cells, respectively,
   a power supply configured to provide power to the input terminal of each of the plurality of load cells;
   a voltage measurement sensor configured to measure a voltage for each of the plurality of fault diagnosis resistors, after the power is provided by the power supply; and
   a controller configured to determine a fault of each of the plurality of load cells based on the measured voltage, wherein the controller includes:
     a fuzzyfication unit, implemented using one or more computing devices, configured to fuzzyficate a degree of a fault of each of the plurality of load cells into a value between 0 and 1 based on the measured voltage, and
     a fault diagnosis unit, implemented using one or more computing devices, configured to determine a load cell having a fuzzyficated value equal to or greater than a reference value, among the plurality of load cells, as a load cell having a fault.

2. The apparatus of claim 1, wherein the fuzzyfication unit is configured to perform fuzzyfication based on equation below:

$$f_i = \left| \frac{\left(\left(\sum_{i=1}^{n} vi\right)/n\right) - vi}{\frac{\sum_{i=1}^{n} vi}{n}} \right|,$$

and
   wherein fi is a fuzzyficated value of a voltage applied to an i-th fault diagnosis resistor, n is a number of the plurality of fault diagnosis resistors, and vi is the voltage applied to the i-th fault diagnosis resistor.

3. The apparatus of claim 1, wherein the controller is configured to determine a fault for each of the plurality of load cells, sequentially.

4. The apparatus of claim 1, wherein the plurality of load cells are configured to detect a force applied to a steering shaft of a mobility device.

5. The apparatus of claim 1, further comprising an output unit, implemented using one or more computing devices, configured to output a number of one or more load cells determined to have a fault, among the plurality of load cells, by at least one of sound, visual, or vibration methods.

6. The apparatus of claim 1, wherein:
   the input terminal includes a first input terminal and a second input terminal, the output terminal includes a first output terminal and a second output terminal,
   the first input terminals of the plurality of load cells are connected to each other, the second input terminals of the plurality of load cells are connected to each other, and
   the first output terminals of the plurality of load cells are connected to each other, and the second output terminals of the plurality of load cells are connected to each other through the fault diagnosis resistor.

7. A method for determining a fault of a load cell, the method comprising:
   providing power to an input terminal of each of a plurality of load cells connected in parallel, a plurality of fault diagnosis resistors connected to an output terminal of each of the plurality of load cells, respectively;
   measuring a voltage for each of the plurality of fault diagnosis resistors, after power is applied; and
   determining a fault of each of the plurality of load cells based on the measured voltage,
   wherein determining the fault includes:

fuzzyficating a degree of a fault of each of the plurality of load cells into a value between 0 and 1 based on the measured voltage, and determining a load cell having a fuzzyficated value equal to or greater than a reference value, among the plurality of load cells, as a load cell having a fault.

8. The method of claim 7, wherein fuzzyficating is performed based on equation below:

$$f_i = \left| \frac{\left(\left(\sum_{i=1}^{n} vi\right)/n\right) - vi}{\frac{\sum_{i=1}^{n} vi}{n}} \right|$$

wherein fi is a fuzzyficated value of a voltage applied to an i-th fault diagnosis resistor, n is a number of the plurality of fault diagnosis resistors, and vi is the voltage applied to the i-th fault diagnosis resistor.

9. The method of claim 7, further comprising determining a fault for each of the plurality of load cells, sequentially.

10. The method of claim 7, wherein the plurality of load cells are configured to detect a force applied to a steering shaft of a mobility device.

11. The method of claim 7, further comprising outputting a number of one or more load cells determined to have a fault, among the plurality of load cells, by at least one of sound, visual, or vibration methods.

12. The method of claim 7, wherein:

the input terminal includes a first input terminal and a second input terminal, the output terminal includes a first output terminal and a second output terminal, the first input terminals of the plurality of load cells are connected to each other, the second input terminals of the plurality of load cells are connected to each other, the first output terminals of the plurality of load cells are connected to each other, and the second output terminals of the plurality of load cells are connected to each other through the fault diagnosis resistor.

13. A non-transitory computer-readable storage medium having stored thereon a program for causing a computer to execute operations comprising:

providing power to an input terminal of each of a plurality of load cells connected in parallel, a plurality of fault diagnosis resistors connected to an output terminal of each of the plurality of load cells, respectively;

measuring a voltage for each of the plurality of fault diagnosis resistors, after power is applied; and determining a fault of each of the plurality of load cells based on the measured voltage, wherein determining the fault includes:

fuzzyficating a degree of a fault of each of the plurality of load cells into a value between 0 and 1 based on the measured voltage, and determining a load cell having a fuzzyficated value equal to or greater than a reference value, among the plurality of load cells, as a load cell having a fault.

14. The non-transitory computer-readable storage medium of claim 13, wherein fuzzyficating is performed based on equation below:

$$f_i = \left| \frac{\left(\left(\sum_{i=1}^{n} vi\right)/n\right) - vi}{\frac{\sum_{i=1}^{n} vi}{n}} \right|$$

wherein fi is a fuzzyficated value of a voltage applied to an i-th fault diagnosis resistor, n is a number of the plurality of fault diagnosis resistors, and vi is the voltage applied to the i-th fault diagnosis resistor.

15. The non-transitory computer-readable storage medium of claim 13, wherein the operations further comprise determining a fault for each of the plurality of load cells, sequentially.

16. The non-transitory computer-readable storage medium of claim 13, wherein the plurality of load cells are configured to detect a force applied to a steering shaft of a mobility device.

17. The non-transitory computer-readable storage medium of claim 13, wherein the operations further comprise outputting a number of one or more load cells determined to have a fault, among the plurality of load cells, by at least one of sound, visual, or vibration methods.

* * * * *